(12) United States Patent
Mkhitarian

(10) Patent No.: US 8,446,125 B2
(45) Date of Patent: May 21, 2013

(54) VEHICLE POWER CHARGER

(75) Inventor: Harry Mkhitarian, Altadena, CA (US)

(73) Assignee: Superior Communications, Inc., Irwindale, CA (US)

( * ) Notice: Subject to any disclaimer, the term of this patent is extended or adjusted under 35 U.S.C. 154(b) by 856 days.

(21) Appl. No.: 12/214,701

(22) Filed: Jun. 20, 2008

(65) Prior Publication Data

US 2009/0315513 A1 Dec. 24, 2009

(51) Int. Cl.
*H02J 7/00* (2006.01)

(52) U.S. Cl.
USPC ............ 320/112; 320/110; 320/114; 320/105

(58) Field of Classification Search
USPC .. 320/110, 112, 114, 105, 113, 115; 439/668, 439/638, 142, 144
See application file for complete search history.

(56) References Cited

U.S. PATENT DOCUMENTS

| | | | |
|---|---|---|---|
| 4,382,221 A | 5/1983 | Reynolds | |
| 5,602,455 A | 2/1997 | Stephens et al. | |
| 5,847,545 A | 12/1998 | Chen et al. | |
| 6,612,875 B1 * | 9/2003 | Liao | 439/675 |
| 6,683,439 B2 | 1/2004 | Takano et al. | |
| D490,058 S | 5/2004 | Mkhitarian | |
| 6,956,353 B1 | 10/2005 | Klitzner | |
| 7,035,126 B1 | 4/2006 | Lanni | |
| 7,224,086 B2 | 5/2007 | Germagian et al. | |
| 7,287,705 B2 * | 10/2007 | Tang | 235/492 |
| 7,530,823 B1 * | 5/2009 | Thornton et al. | 439/136 |
| 7,784,610 B2 | 8/2010 | Mason | |
| 7,910,833 B2 | 3/2011 | McGinley et al. | |
| 7,960,648 B2 | 6/2011 | McGinley et al. | |
| 2004/0085043 A1 | 5/2004 | Germagian et al. | |
| 2004/0204170 A1 | 10/2004 | Mkhitarian | |
| 2004/0204177 A1 | 10/2004 | Pon | |
| 2005/0057218 A1 * | 3/2005 | Chen | 320/115 |
| 2005/0194935 A1 | 9/2005 | Kubota et al. | |
| 2006/0267549 A1 | 11/2006 | Kung | |
| 2007/0126290 A1 | 6/2007 | Jaynes et al. | |
| 2007/0222414 A1 | 9/2007 | Chen | |
| 2007/0228831 A1 | 10/2007 | Eldredge | |
| 2008/0157712 A1 | 7/2008 | Garcia | |
| 2008/0211310 A1 | 9/2008 | Jitaru et al. | |
| 2008/0318475 A1 * | 12/2008 | Poo et al. | 439/607 |
| 2009/0179610 A1 | 7/2009 | Lin | |
| 2009/0243537 A1 * | 10/2009 | Chen et al. | 320/103 |
| 2011/0121656 A1 | 5/2011 | Hicks et al. | |

FOREIGN PATENT DOCUMENTS

JP 5-095414 4/2005

* cited by examiner

*Primary Examiner* — Samuel Berhanu
(74) *Attorney, Agent, or Firm* — Snell & Wilmer LLP

(57) ABSTRACT

A vehicle power charger includes a generally cylindrically-shaped body portion suitable for plugging into a vehicle cigarette lighter receptacle, a spring-loaded metal contact pin for engagement with electrical contacts inside the receptacle, and an oblong end portion formed at an angle to the cylindrically-shaped body portion including a cavity that holds and protects one or more USB ports, and a cavity cover that slides, rotates or flips between open and closed positions.

6 Claims, 4 Drawing Sheets

VEHICLE POWER CHARGER

FIELD OF THE INVENTION

This invention relates to a vehicle power charger that includes a fixed, dedicated charging cable for a first device, such as a cellular telephone, and one or more USB ports useful, e.g., for charging the battery of a second device through a separate charging cable. The USB ports are positioned inside a cavity formed near one end of the device. The cavity has a cover that is moveable between a closed position and an open position. With the cover open, the USB connectors are exposed for connection, e.g., through a charging cable, to the battery of the second device. The cover may slide, flip, or rotate between open and closed positions.

SUMMARY OF THE INVENTION

The vehicle power charger of this invention may include a generally cylindrically-shaped body portion of a size, length and shape suitable for plugging into a vehicle, e.g., an automobile, cigarette lighter receptacle. At one end of the body is a spring-loaded metal contact pin for engagement with the electrical contacts inside the receptacle. Along the outer surface of the sidewall of the body portion near the contact pin there may be one or more spring loaded protrusions for engaging the inner surfaces of the receptacle when the charger is inserted into the receptacle.

The charger also includes, at a second end of the body portion, an oblong portion formed at an angle to the cylindrical-shaped body portion. This oblong portion has an opening at its end to receive a cable for connection of the charger to a cellular telephone. The oblong portion also includes the cavity, and the moveable cover for the cavity, that holds and protects one or more USB ports. The cover may slide, rotate or flip between open and closed positions.

Inside the cylindrical shaped body portion is an electrically-conductive connector that connects to the metal contact pin at one end, and to one or more USB connectors that protrude into the USB cavity, below the cover of the USB cavity, at a second end. The electrically-conductive connector may be a flat metal plate that has a narrowed width at the end abutting the metal contact pin to receive a cylindrical spring that urges the pin forward, but allows the pin to yield by moving against the spring. The USB connectors may be formed on this plate, at an angle suitable for protrusion into the USB cavity.

BRIEF DESCRIPTION OF THE DRAWINGS

These and other features, aspects and advantages of the new vehicle power charger may better be understood by reference to the following drawings and related disclosures. In the drawings, which are provided for illustrative purposes only.

DETAILED DESCRIPTION OF THE PREFERRED EMBODIMENTS

Figure 1:
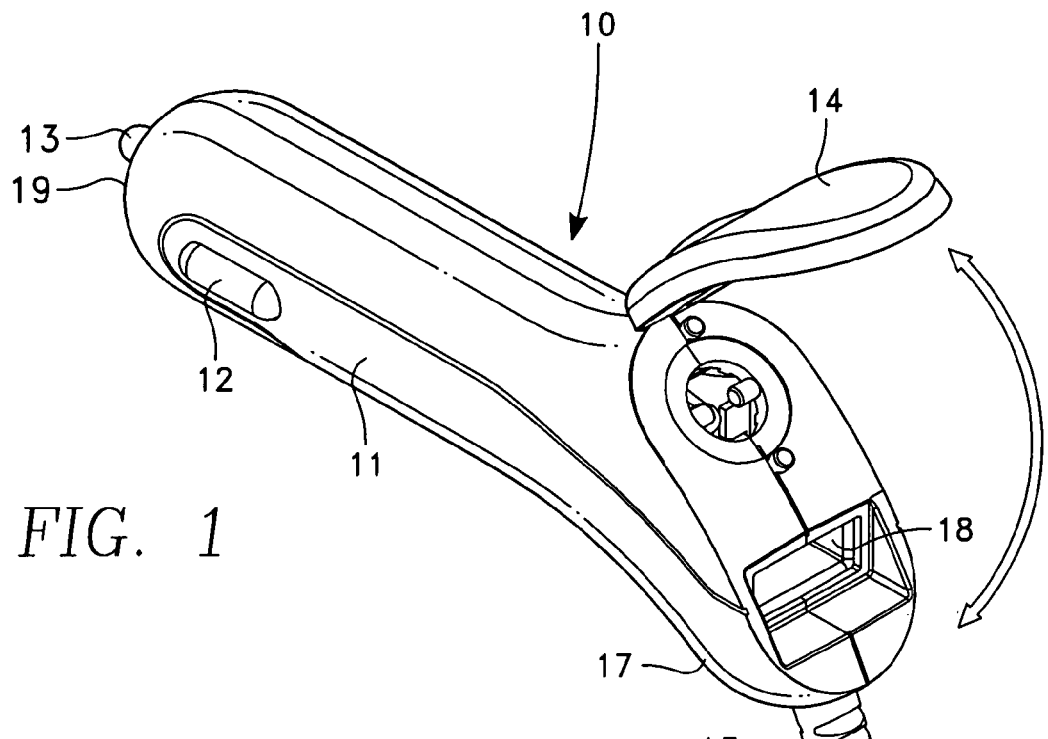
FIG. 1 is a perspective view of a first embodiment of a vehicle power charger with a cover for a USB port that flips between open and closed positions.
Figure 2:
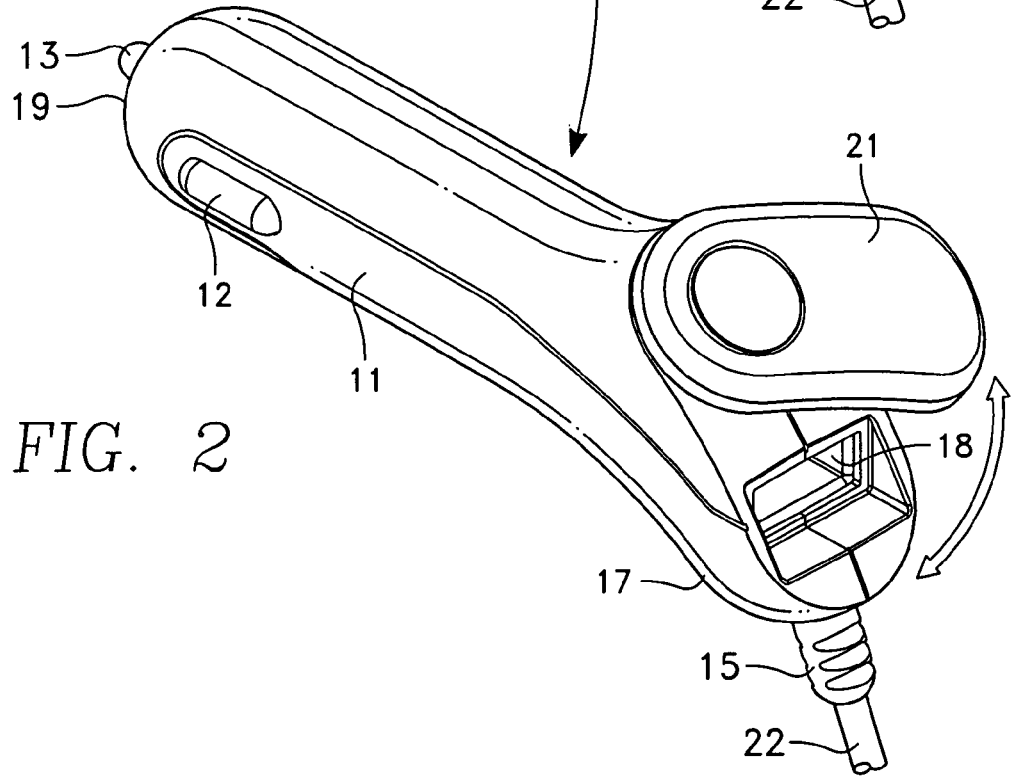
FIG. 2 is a perspective view of a second embodiment of a vehicle power charger with a cover for a USB port that rotates between open and closed positions.
Figure 3:
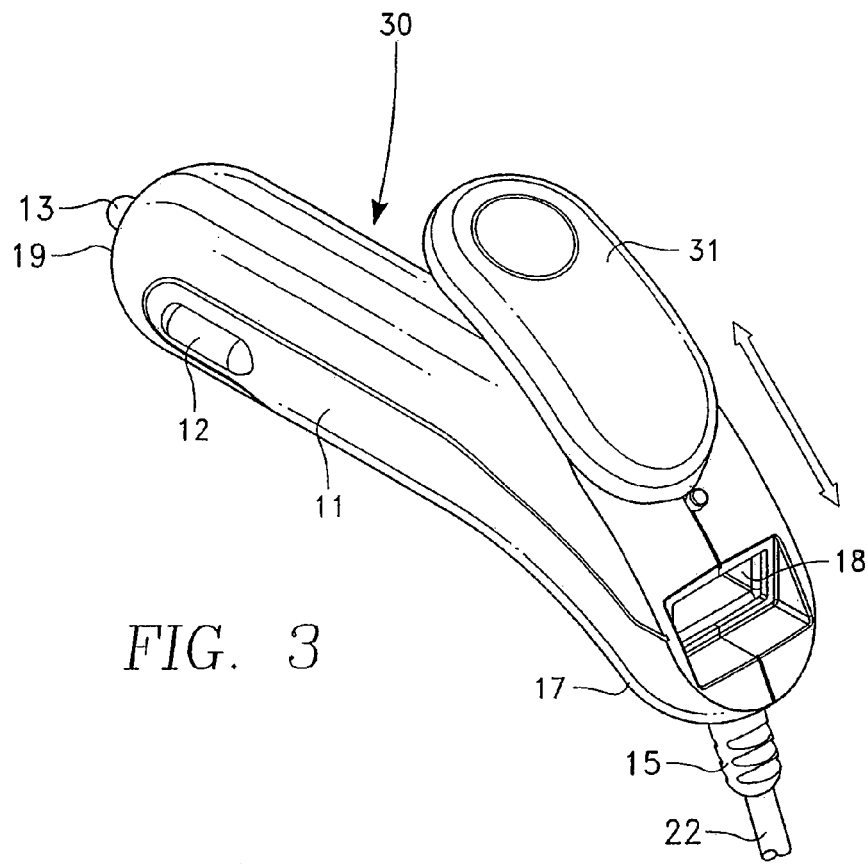
FIG. 3 is a perspective view of a third embodiment of a vehicle power charger with a cover for a USB port that slides between open and closed positions.
Figure 4:
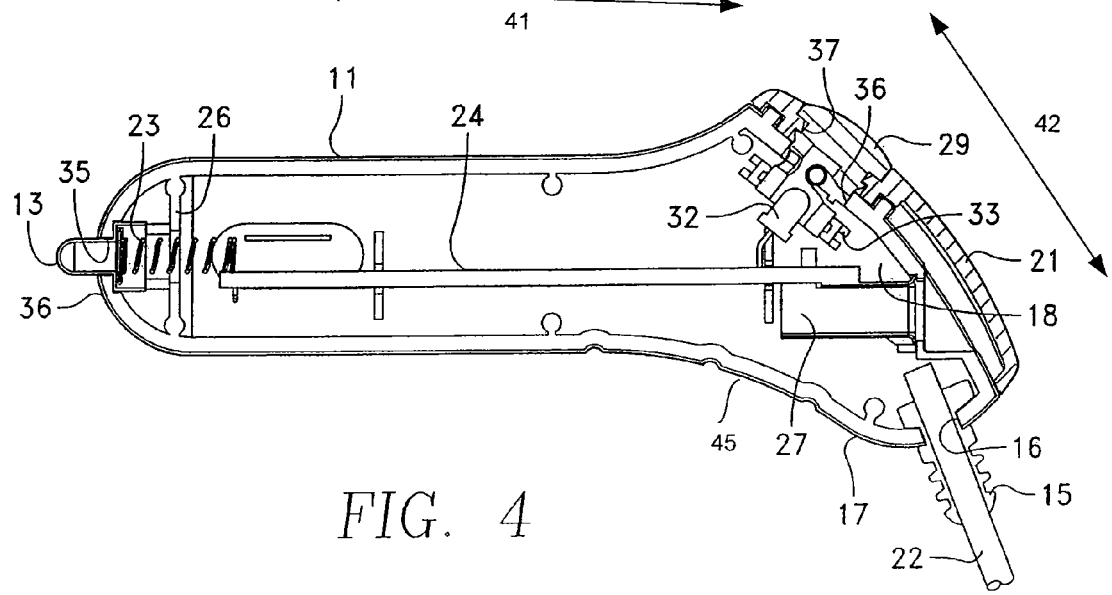
FIG. 4 is a side elevation view of the charger embodiment of FIG. 2, taken in longitudinal cross section, showing the internal structure of the charger.
Figure 5:
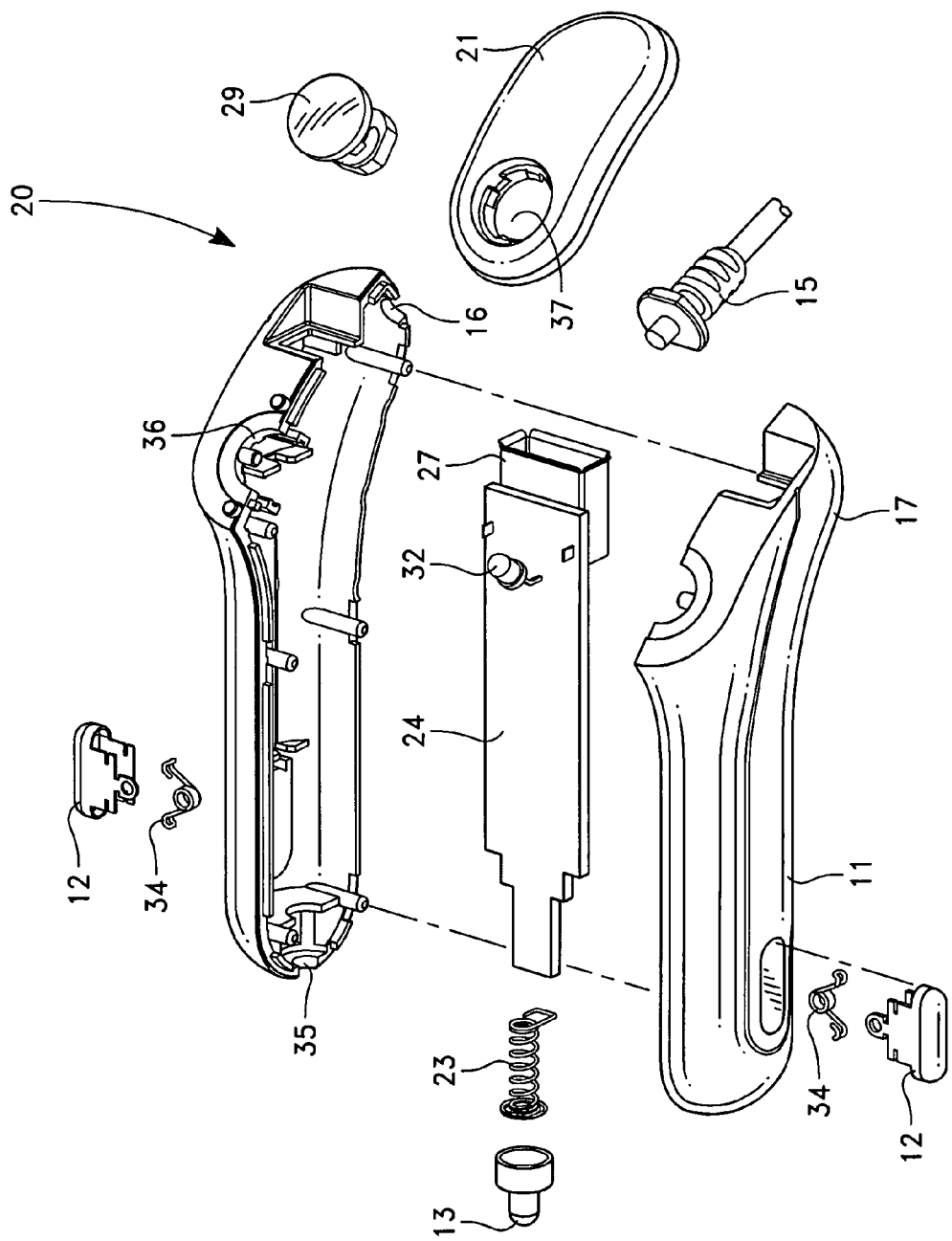
FIG. 5 is an exploded view of the elements of the charger embodiment of FIG. 2.
Figure 6:
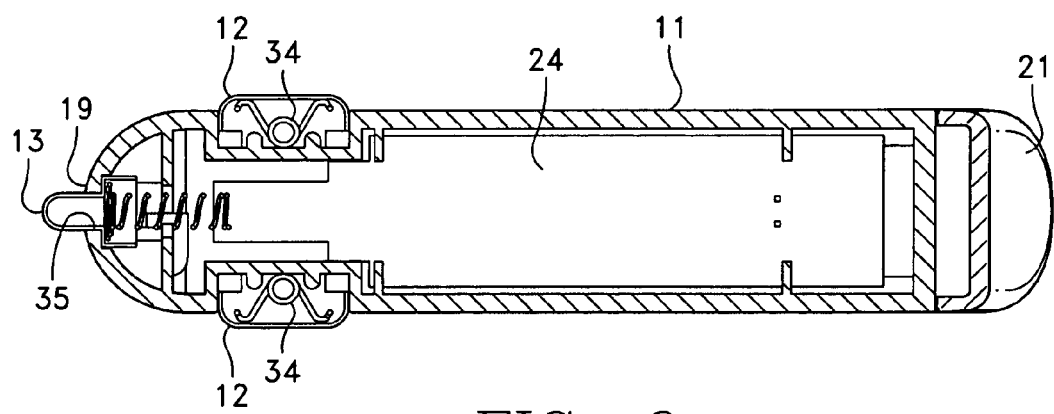
FIG. 6 is a bottom elevation view of the charger embodiment of FIG. 2, taken in longitudinal cross section, showing the internal structure of the charger.

With reference now to the drawings, FIGS. 1, 2, and 3 show perspective views of vehicle power charger embodiments 10, 20, and 30, respectively. FIGS. 4, 5, and 6 show the internal and external elements of the charger of FIG. 2. Each of these embodiments includes a spring-loaded metal contact pin 13 projecting from the rounded, distal end 19 of generally cylindrical shaped body portion 11. Body portion 11 is integrally formed with angled, generally oblong shaped body portion 17. Protruding from the external sidewall surfaces of body portion 11 are a plurality of spring-loaded members that are of a size and shape to engage frictionally the inner wall surfaces of a cigarette lighter receptacle. Each embodiment includes a cavity 18 in body portion 17 for holding and protecting a USB port. Each embodiment also includes an opening 16 at the end of body portion 17 to receive an electrical connector 15 for cable 22, which also connects to a separate, chargeable device. FIG. 4 illustrates a first axis 41 that the body portion 11 lies on and a second axis 42 that the oblong shaped body portion 17 lies on. In certain embodiments, the first axis 41 and the second axis 42 may create an obtuse angle. In addition and/or as an alternative, near the intersection between the body portion 11 and the oblong shaped body portion 17 (e.g., proximal to the location labeled 45) the exterior surface of the vehicle power charger 20 may be curved to facilitate easier holding or manipulation of the vehicle power charger 20 by the user.

Turning back to FIG. 1, the charger shown includes cover 14 for cavity 18 that flips between open and closed positions. The charger shown in FIG. 2 includes cover 21 for cavity 18 that pivotably rotates between open and closed positions. The charger shown in FIG. 3 includes cover 31 for cavity 18 moveably attached to the oblong portion 17 that slides between open and closed positions.

Generally cylindrical-shaped body portion 11 includes opening 35 at its distal end 36. Metal contact pin 13 protrudes through opening 35, and is spring-loaded via spring 23, which urges pin 13 outwardly from opening 13. Spring 23 is held in appropriate linear alignment with pin 13 by internal plate 26.

Spring 23 also engages the distal end of longitudinally-positioned electrical conductor plate 24, which extends the internal length of body portion 11, and joins to electrical conductor elements 27 and 28 inside body portion 17. Electrical conductor post 32 connects to conductor 24 and to USB connector 33 inside cavity 18. There may be more than one connector in this Cavity 1. Cavity cover 21 rotates around rivet 29, which fits through opening 37 in cover 21, and into opening 36 in body portion 17. Cover 21 rotates between closed and open positions. When cover 21 is open, which permit connection of a charging to connector 33 inside cavity 18 is exposed and available for connection to a charging cable.

While the foregoing descriptions set forth different embodiments in specific detail, alterations, variations and modifications may be made without departing from the spirit and scope of the invention. As such, the inventor desires to avail himself of all such variations, alterations and/or modifications, and the invention should not be limited by, or to, the above-described specific embodiments.

What is claimed is:

1. A vehicle power charger comprising:

a cylindrically-shaped body portion of a size, length and shape suitable for plugging into a vehicle cigarette lighter receptacle having a first end and a second end, the cylindrically-shaped body portion defining a first axis that the cylindrically-shaped body portion extends around;

a spring-loaded metal contact pin located at the first end of the cylindrically-shaped body portion for engagement with an electrical contact inside the receptacle;

an oblong portion located at the second end of the cylindrically-shaped body portion and having a top end and a bottom end and defining a second axis, with an opening at the bottom end, the first axis and the second axis formed at an obtuse angle such that the top end of the oblong portion is angled towards the first end of the cylindrically-shaped body portion and the bottom end of the oblong portion is angled away from the first end of the cylindrically-shaped body portion, the oblong portion including a front face surface facing away from the first end of the cylindrically-shaped body portion and extending transverse to the first axis to form an obtuse angle with the first axis such that a top end of the front face surface is angled towards the first end of the cylindrically-shaped body portion and a bottom end of the front face surface is angled away from the first end of the cylindrically-shaped body portion, with the first axis passing through the front face surface, said front face surface including a first opening and a second opening, the first opening being between the second opening and the top end of the front face surface, said oblong portion including a cavity;

a female Universal Serial Bus (USB) port held in place within the cavity and extending along an axis and being accessible through the second opening of the front face surface, the female USB port configured to receive a male USB plug passed into the second opening to charge a first mobile communication device;

a rivet having a first end and a second end and defining an axis, with the first end passing through the first opening of the front face surface at an angle perpendicular to the front face surface;

a cover having an opening and being pivotally attached to the front face surface by the second end of the rivet passing through the opening of the cover, the cover configured to cover the front face surface and pivot about the axis of the rivet between an open position in which the cover does not cover the female USB port and allows the male USB plug to enter the female USB port, and a closed position in which the cover covers the female USB port and blocks the male USB plug from entering the female USB port, the cover covering all of the front face surface in the closed position and not covering all of the front face surface in the open position;

an electrical connector configured to receive a cable through the opening at the bottom end of the oblong portion; and a cable extending from the opening at the bottom end of the oblong portion to form an acute angle with the axis the female USB port extends along, and being attached to the electrical connector to charge a second mobile communication device at a same time the first mobile communication device is charged from the female USB port.

2. The charger of claim 1 further comprising, along an outer surface of a sidewall of the cylindrically-shaped body portion, near the contact pin, at least one spring loaded protrusion for engaging inner surfaces of the receptacle when the charger is inserted into the receptacle.

3. The charger of claim 1 further comprising, inside the cylindrically-shaped body portion, an electrically-conductive connector that connects to the metal contact pin at one end, and to one or more USB connectors that protrude into the cavity, below the cover, at a second end.

4. The charger of claim 3 wherein the electrically-conductive connector comprises a flat metal plate that has a narrowed width at its distal end near the metal contact pin to receive a cylindrical spring that urges the metal contact pin forward.

5. The charger of claim 4 wherein the USB connectors are attached to the flat metal plate at an angle suitable for protrusion into the cavity.

6. The charger of claim 1 wherein an outer surface joining the cylindrically-shaped body portion and the oblong portion is curved.

* * * * *